United States Patent
Yagi et al.

(10) Patent No.: US 6,595,073 B1
(45) Date of Patent: Jul. 22, 2003

(54) MAGNETOSTRICTIVE DEVICE FOR TORQUE SENSOR AND METHOD OF MANUFACTURE OF THE SAME

(75) Inventors: Wataru Yagi, Aichi-ken (JP); Kouta Maruyama, Aichi-ken (JP); Atsunao Itoh, Aichi-ken (JP); Yoshio Kato, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/512,804

(22) Filed: Feb. 25, 2000

(30) Foreign Application Priority Data

Feb. 25, 1999 (JP) .......................................... 11-048469

(51) Int. Cl.[7] ................................................ G01L 3/14
(52) U.S. Cl. ................ 73/862.333; 29/593; 73/862.334
(58) Field of Search .................... 73/862.333, 862.335, 73/862.336, 862.334; 29/593

(56) References Cited

U.S. PATENT DOCUMENTS

| | | | | | |
|---|---|---|---|---|---|
| 4,823,620 A | * | 4/1989 | Edo et al. | .............. | 73/862.334 |
| 4,964,308 A | * | 10/1990 | Edo et al. | .............. | 73/862.333 |
| 5,491,369 A | * | 2/1996 | Ishino et al. | .................. | 310/26 |
| 5,520,059 A | * | 5/1996 | Garshelis | ............... | 73/862.335 |
| 5,646,356 A | * | 7/1997 | Ling et al. | ............. | 73/862.335 |

FOREIGN PATENT DOCUMENTS

JP          7-10011          2/1995

* cited by examiner

Primary Examiner—Harshad Patel
(74) Attorney, Agent, or Firm—Finnegan, Henderson, Farabow, Garrett & Dunner, L.L.P.

(57) ABSTRACT

A magnetostrictive device for a torque sensor which has a high sensor sensitivity whether the excitation frequency is in a high frequency range or in a low frequency range and can withstand excess load torques well, and also a method of easily manufacturing the device. In manufacturing the magnetostrictive device 1 for a torque sensor, which has a magnetic anisotropic portion 15 formed on the surface of a shaft body 10 thereof, the method of forming the magnetic anisotropic portion 15 comprises the steps of: forming spiral grooves in the surface of the shaft body 10 to form a plurality of troughs 16 and ridges 17 alternately; and directly applying a compressive stress only to the ridges 17 to cause deformations accompanied by plastic flow and to provide an almost planar plateau portion 171 at a crest portion of each of the ridges 17.

10 Claims, 9 Drawing Sheets

MAGNETOSTRICTIVE DEVICE FOR TORQUE SENSOR AND METHOD OF MANUFACTURE OF THE SAME

BACKGROUND OF THE INVENTION

1. Technical Field

The present invention relates to a highly sensitive magnetostrictive device used in a non-contact magnetostrictive torque sensor and a method of manufacturing the same.

2. Related Art

Figure 1:
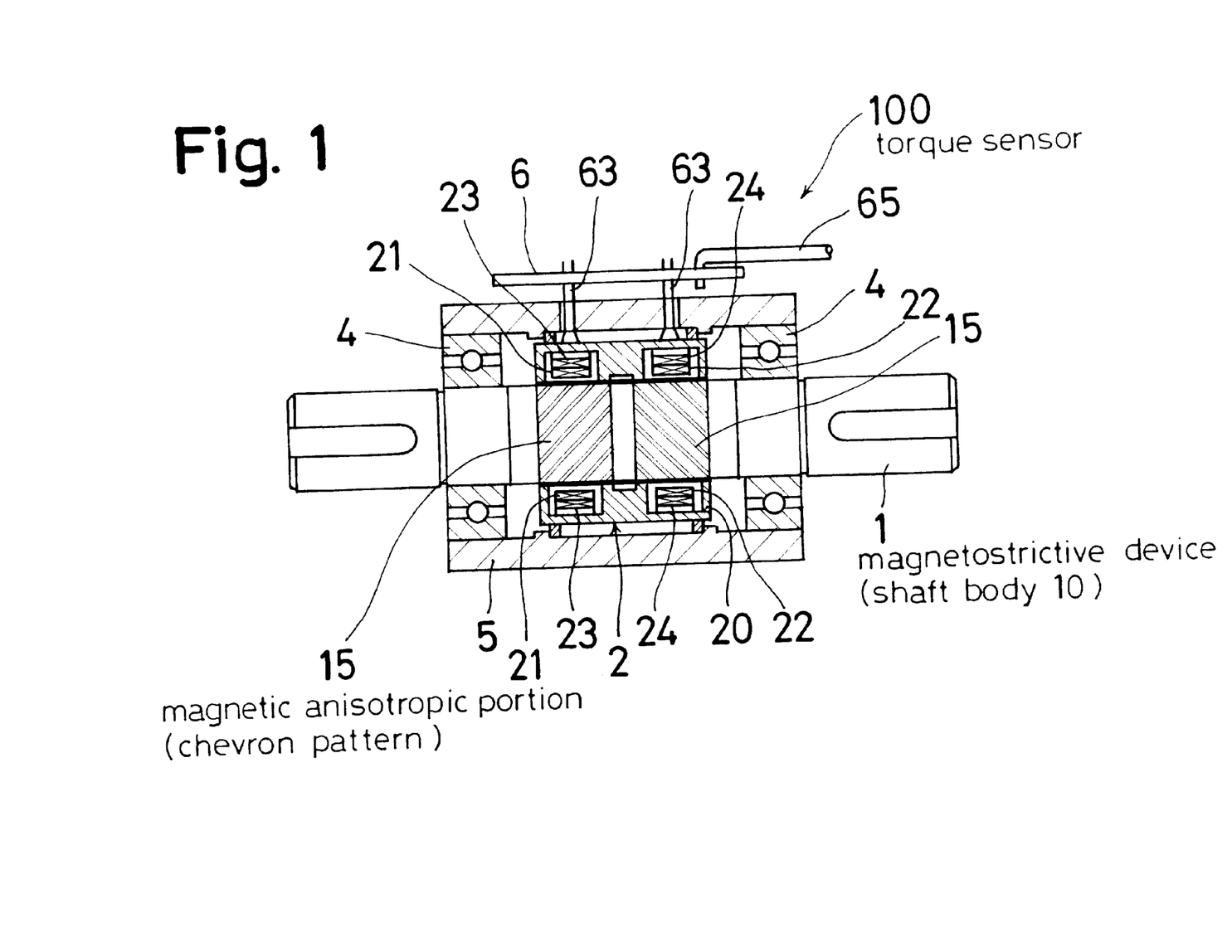
FIG. 1 is an explanatory view showing the construction of a torque sensor in Embodiment 1.
Figure 2:
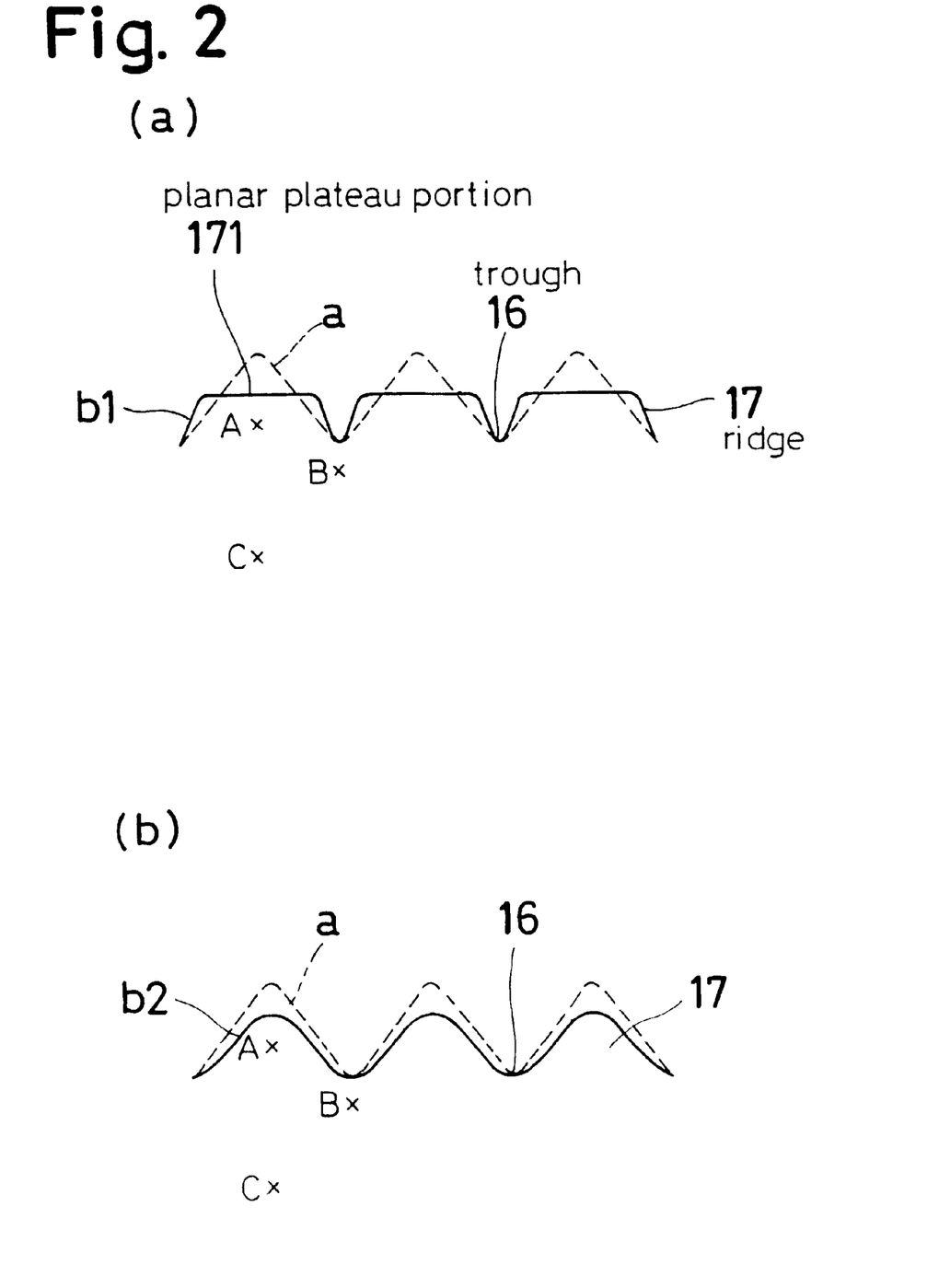
FIGS. 2(a) and 2(b) are explanatory views showing how ridges in the Embodiment 1 are deformed, with (a) representing a specimen of this invention and (b) representing a specimen for comparison.

A magnetostrictive torque sensor 10 has been known which uses a magnetostrictive device 1 formed with a magnetic anisotropic portion 15, as shown in FIG. 1 later. In this magnetostrictive torque sensor 10, the permeability of the magnetic anisotropic portion 15 changes according to the magnitude of a torque applied to the magnetostrictive device 1. A change in the permeability is detected as by a detection coil 23 to determine the magnitude of the applied torque.

It is desired that the magnetostrictive device 1 of such a magnetostrictive torque sensor 10 be excellent and stable in its magnetic characteristic.

The official gazette of JP-B-7-10011 discloses a magnetostrictive device manufacturing method which forms a compression-hardened layer in the entire magnetic anisotropic portion (magnetostrictive portion) of the magnetostrictive device by shot-peening the magnetic anisotropic portion.

With this conventional technique, it is said to be possible to obtain a magnetostrictive device with a small hysteresis and a high detection sensitivity.

The magnetostrictive device produced by the conventional manufacturing method, however, has the following problem.

The shot peening of the whole magnetic anisotropic portion may change the groove shape of the magnetic anisotropic portion in a direction that degrades the sensitivity.

That is, the shape formed by the shot peening is difficult to control. The shot peening deforms projections in a direction that flattens them and edges in a direction that rounds them. Hence, when the magnetic anisotropic portion having troughs and ridges arranged alternately is subjected to the shot peening, the ridges may get lower in height than expected or rounded more than necessary.

The magnetostrictive device passes a magnetic flux through the ridges in the magnetic anisotropic portion to measure its distortion. When the excitation frequency in the torque sensor is in a high frequency range of, for example, about 50 kHz, the magnetic flux concentrates on the vertices of the ridges. Therefore, the larger the area of the top of the ridge, the larger the area through which the magnetic flux passes and the greater the contribution to the improvement of the sensor sensitivity.

When the shot peening is performed, the crest is rounded as described above, making it difficult to increase the flat area at the crest. For this reason, in the high frequency region, the shot peening reduces the area through which the flux can pass and lowers the sensor sensitivity.

Further, a change in the height of the ridge caused by the shot peening changes the air gap between the ridge and the coil arranged opposed to the ridge. This in turn leads to a reduction in the sensor sensitivity.

The torque sensor using the magnetostrictive device obtained by the shot peening has a problem of poor stability against excess load torques and low sensor sensitivity when the excitation frequency is set in a low frequency region (for example, 20–30 kHz). This is considered due to the fact that in a low frequency region the flux penetrates relatively deep into the ridge, whereas the shot peening can only strengthen the surface of the ridge but not a relatively deep part into which the flux penetrates.

The magnetic anisotropic portion that has undergone the conventional shot peening has a problem of low sensor sensitivity not only when the excitation frequency is high but when it is low.

The present invention has been accomplished with a view to overcoming the conventional drawback and provides a magnetostrictive device whose sensor sensitivity is high whether the excitation frequency is in the high frequency region or in the low frequency region and which can withstand an excess load torque, and also provides a method of easily manufacturing the magnetostrictive device.

SUMMARY OF THE INVENTION

According to an aspect of the invention, there is provided a method of manufacturing a magnetostrictive device for a torque sensor having a magnetic anisotropic portion formed on a surface of a shaft body thereof, wherein the magnetic anisotropic portion is formed by forming spiral grooves in the surface of the shaft body to form a plurality of troughs and ridges alternately and by directly applying a compressive stress only to the ridges to cause deformations accompanied by plastic flow and provide an almost planar plateau portion at a crest portion of each of the ridges.

What should be noted most in this invention in forming the magnetic anisotropic portion is to, after forming the plurality of troughs and ridges alternately, directly apply a compressive stress to only the ridges to form the plateau portion.

The forming of the grooves in the shaft body can be done by a variety of methods, including a plastic forming process such as form rolling and a cutting process.

The troughs and ridges made by the forming of the grooves may be triangular, trapezoidal or of other shapes. The grooves are formed as spiral grooves at two locations in the shaft body in a conventionally known pattern in which the two sets of spiral grooves are inclined at the same angles (almost 45°) in different directions.

Next, only the ridges are applied directly with a compressive stress. This compressive stress is not applied to the troughs. Such a compressive stress can be applied easily by using a forming process described later, such as rolling and swaging, that uses a tool.

The ridges are applied with the compressive stress to cause deformations accompanied by plastic flow. This forming process is performed to form almost planar plateau portions. That is, if the ridges before being applied with the compressive stress are triangular in shape, the forming process flattens the crests of the ridges to form them into a trapezoidal shape. When the ridges before being applied with the compressive stress are trapezoidal in shape, the forming process further expands the plateau portions of the crests to form the ridges into a trapezoidal shape. When the ridges before being applied with the compressive stress are of sine waveform in shape, the forming process flattens the crests and nearby portions to form them into an almost trapezoidal shape.

The material of the shaft body may use any material applicable to the torque sensor's magnetostrictive device. In more specific terms, the material includes Fe—Cr alloys and Fe—Ni—Mo alloys.

Next, the workings of the invention will be described.

In this invention, only the ridges are applied with the compressive stress to cause deformations accompanied by plastic flow and thereby provide the plateau portions. Unlike the conventional shot peening which rounds the ridges, the compressive stress used In this invention is applied to Increase the area of the plateau portion at the crest of the ridge. The increase in the area of the crest portion results in an increase in the flux penetrating area when the excitation frequency is high. Hence, the torque sensor's magnetostrictive device thus obtained has a very high sensor sensitivity when the excitation frequency is high.

The plateau portion is formed by the deformation accompanied by the plastic flow. Therefore, underneath the plateau portion, the residual compressive stress can be applied to portions at relatively large depths from the surface.

That is, when the conventional shot peening is performed, the residual compressive stress remains at the surface layer but sharply decreases as the depth increases.

In this invention, by contrast, the deformations accompanied by plastic flow can leave the residual compressive stress even in relatively deep portions below the plateau portion.

Therefore, when the magnetostrictive device is applied with an excess load torque, the influence of the applied torque can be suppressed in portions down to a relatively large depth below the ridge. This in turn can maintain a high sensor sensitivity even when the excitation frequency is relatively low and the magnetic flux penetrates relatively deep into the ridges.

Hence, it is possible to provide a magnetostrictive device for a torque sensor which has a high sensor sensitivity whether the excitation frequency is in the high frequency region or in the low frequency region and can withstand an excess load torque satisfactorily and to provide a method of easily manufacturing such a magnetostrictive device.

In the above manufacturing method, a heat treatment process may be added either before or after the groove formation process, as required. In that case, the microstructure of the shaft body has an improved stability against the excess load torque.

According to another aspect of the invention, it is preferred that the application of the compressive stress to the ridges be performed by using a rolling process or a swaging process. In that case, the degree of forming and the shape of the ridge can be controlled with precision, which in turn facilitates the forming of the plateau portion.

According to still another aspect of the invention, it is preferred that the forming of the spiral grooves and the application of the compressive stress be performed continuously by using one tool. This enables a significant reduction in the number of processes and therefore a reduced manufacturing cost. More specifically, it may be possible to use a tool that integrally combines a form-rolling tool and a rolling tool.

According to a further aspect of the invention, it is preferred that the compressive stress be applied to the ridges so that the relation $0.2<(H_0-H_1)/H_0<0.48$ holds where $H_0$ is a height of the ridges before being applied with the compressive stress and $H_1$ is a height of the ridges after being applied with the compressive stress. In that case, the plateau portions of the ridges can be hardened reliably and the stability against excess load torque improved.

According to a further aspect of the invention, it is preferred that the shaft body be applied with an excess load torque one or more times after the magnetic anisotropic portion is formed. That is, the magnetostrictive device should preferably be preloaded with an excess load torque one or more times before it is put to actual use. This can further improve the stability against the excess load torque.

The excess load torque is a torque which exceeds the measuring range (normal use range) of the magnetostrictive device.

Next, according to a further aspect of the invention, there is provided a magnetostrictive device for a torque sensor having a magnetic anisotropic portion formed on a surface of a shaft body thereof, wherein the magnetic anisotropic portion has a plurality of troughs and ridges arranged alternately, the troughs and ridges being formed by forming spiral grooves in the surface of the shaft body, the ridges each having an almost planar plateau portion, the plateau portion being formed by directly applying a compressive stress only to the ridges and deformations accompanied by plastic flow.

What should be noted most in this invention is that the ridges are formed with the plateau portions by the forming method described above.

The presence of the plateau portions, as described above, can increase the flux penetrating area when the excitation frequency is high. Thus, the torque sensor's magnetostrictive device thus obtained has a very high sensor sensitivity.

Because the plateau portions are hardened by the compression deformation accompanied with the plastic flow, the magnetostrictive device is not easily deformed permanently when applied with an excess load torque. This in turn improves stability against the excel load torque.

With the present invention, therefore, it is possible to provide a magnetostrictive device for a torque sensor which has a high sensor sensitivity even when the excitation frequency is in the high frequency range.

According to a further aspect of the invention, it is preferred that the residual compressive stress in the plateau portion be 30 kgf/mm$^2$ or higher at the surface and 20 kgf/mm$^2$ or higher at a depth of 0.3 mm from the surface.

When the residual compressive stress is less than 30 kgf/mm$^2$ at the surface of the plateau portion, there is problem of degraded stability against the excess load torque. On the other hand, because the residual compressive stress on the surface does not degrade the magnetic characteristic significantly, the upper limit of the residual compressive stress should preferably be around 80% of the tensile strength of the material.

BRIEF DESCRIPTION OF THE DRAWINGS

Preferred embodiments of the present invention will be described in detail based on the following figures, wherein.

DESCRIPTION OF THE PREFERRED EMBODIMENTS OF THE INVENTION

Embodiment 1

A magnetostrictive device for a torque sensor and a method of its manufacture according to this embodiment of the invention will be described by referring to FIGS. 1 to 6.

The magnetostrictive device for torque sensor 1 of this embodiment, as shown in FIG. 1, is the one used for a magnetostrictive torque sensor 100.

In this example, three kinds of magnetostrictive devices 1 using a Fe—Cr alloy material are prepared: two kinds (E1, E2) as the specimens of this invention and one kind (C1) as a specimen for comparison. Their performances are compared.

These magnetostrictive devices are adjusted to have a hardness of about Hv300 in the shaft body for ease of comparison.

The magnetostrictive devices of this embodiment (E1, E2, C1) all have a measuring torque range of +7 to −7 Nm.
(Procut of the Invention E1)

The specimen of the invention E1, as shown in FIG. 1, is a magnetostrictive device for a torque sensor having a magnetic anisotropic portion 15 formed on the surface of a shaft body 10.

The magnetic anisotropic portion 15, as shown in FIG. 2(a), has a plurality of troughs 16 and ridges 17 arranged alternately by forming a spiral groove in the surface of the shaft body 10. The ridges 17 have an almost planar plateau portion 171, which is obtained by directly applying a compressive stress to only the ridges to cause deformation accompanied by a plastic flow.

The specimen of the invention E1 was manufactured as follows. Materials were compounded to obtain the composition shown in Table 1 and an ingot was made. Then, the ingot was hot-forged to form a shaft body 20 mm in outer diameter. Next, the shaft body was machined into a solid cylinder measuring 16 mm in outer diameter and 120 mm in length.

Figure 3:
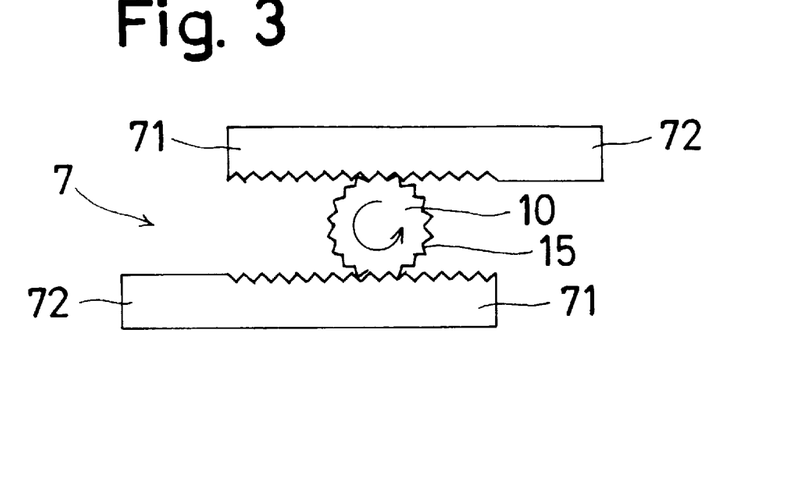
FIG. 3 is an explanatory view showing a process of form-rolling and rolling a specimen of the invention E1 in the Embodiment 1.

Next, as shown in FIG. 3, the shaft body was form-rolled to form in its surface spiral grooves 1.0 mm wide and 0.5 mm deep in a so-called chevron pattern in which the grooves are at 45 degrees to the axis direction. This chevron pattern is provided at two locations laterally symmetrical with respect to the center of the shaft body, with the groove inclination directions of these patterns opposed to each other.

Thus, as indicated by a dashed line a of FIG. 2(a), the troughs 16 and the ridges 17 are alternately formed at these two locations on the shaft body.

Next, a compression stress was directly applied only to the ridges 17 to cause their deformations accompanied by plastic flows. In more concrete terms, a tool 7 having both a form-rolling portion 71 and a rolling portion 72, as shown in FIG. 3, is used to perform the rolling operation on the ridges 17 immediately following the form-rolling operation. As a result, the crests of the ridges 17 are flattened to form the almost planar plateau portions 171 as indicated by a solid line b1 of FIG. 2(a).

Next, the shaft body was subjected to an excess load application process in which an excess load torque was applied once to the shaft body. The excess load torque is set at ±150 Nn.

In this manner, the magnetostrictive device as the specimen of this invention E1 was obtained.
(Specimen of the Invention E2)

The specimen of the invention E2 was subjected to a heat treatment after the form rolling of the specimen of the invention E1 before the plateau portions 171 were formed.

The heat treatment involves keeping the specimen in a vacuum at a temperature of 1000° C. for 1.5 hours, cooling the specimen by a nitrogen gas and then,quenching it. This is followed by a tempering in which the specimen is kept in a vacuum at 680° C. for one hour.

This process has produced a microstructure of the shaft body in which an unstable residual austenite is dissolved and fine spheroidal alloy carbides (such as $(FeCr)_{23}C_6$, $(FeCr)_7C_3$, $(FeCr)_3C$, etc.) are uniformly scattered in a matrix of low-carbon martensite.

Figure 4:
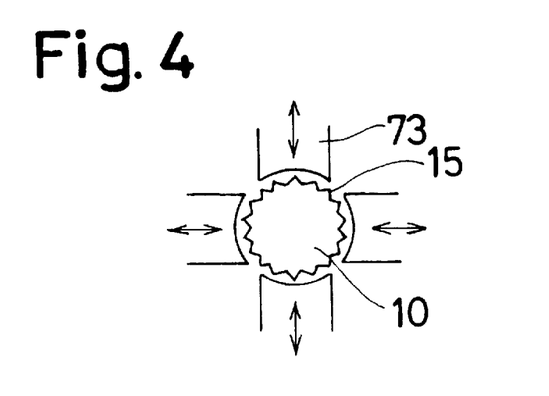
FIG. 4 is an explanatory view showing a process of swaging a specimen of the invention E2 in the Embodiment 1.
Figure 5:
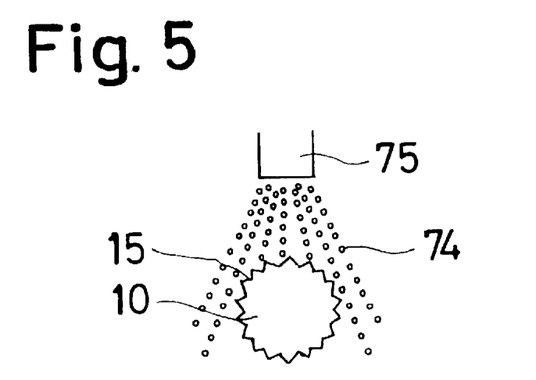
FIG. 5 is an explanatory view showing a process of shot-peening a comparison specimen C1 in the Embodiment 1.

After the heat treatment, only the ridges 17 are directly applied with a compressive stress to cause deformation accompanied by plastic flow. To described in more detail, as shown in FIG. 4, a swaging tool 73 is used to swage the ridges 17. Then, as indicated by the solid line b1 of FIG. 2(a), almost planar plateau portions 171 are formed at the crests of the ridges 17. Then, the excess load application process as described above is performed. In other respects, the similar operations to those performed on the specimen of the invention E1 were carried out.

As a result, a magnetostrictive device as the specimen of the invention E2 was obtained.
(Specimen for Comparison C1)

The specimen for comparison C1 was manufactured by forming grooves by the form rolling and then heat-treating the specimen, as in the case of the specimen of the invention E2. In the heat treatment, however, the tempering temperature was changed to 650° C.

After the heat treatment, the entire magnetic anisotropic portion underwent the shot peening instead of the swaging. To describe in more detail, grains 74 of 0.3 mm in diameter having a hardness of Hv500 were ejected from a nozzle 75 for 120 seconds in the shot peening process. As a result, the form-rolled toughs and ridges changed in shape to those illustrated by a solid line b2 in FIG. 2(b). That is, the crest portions of the ridges 17 were rounded. Next, the excess load application process was performed in a way described above. In other respects, the specimen C1 underwent the similar operations that were performed on the specimen of the invention E2.

Next, in this embodiment, mechanical properties of the specimens (E1, E2, C1) were measured. The hardness measurement was made by a micro-Vickers method with a load of 100 g and a load application duration of 20 seconds. The result of measurement is shown in Table 2.

As can be seen from Table 2, these specimens have nearly equal values in terms of internal hardness, tensile strength and yield point.

Next, the residual compressive stresses in the crest portions of the ridges 17 in the magnetic anisotropic portion 15 of these magnetostrictive devices were measured (plateau portions 171 for E1 and E2, and crest for C1) The measurement points are at the surface and at a depth of 0.3 mm.

The measurement of the residual compressive stress involves electrolytic-polishing the portion to be measured and using an apparatus of Rigaku Corp. make (PCPS-incorporated type 150C) that irradiates X ray. A Cr tube bulb and a V-filter were used, an inlet slit was 2 mm wide and an output was 30 kV×10 mA. The measurement was made using an inclination method, with the troughs masked with a vinyl tape and the direction of measurement set at an angle of 450° to the axial direction. The analysis was done by a half-value width median point method.

The result of measurement is shown in Table 2.

As can be seen from Table 2, all of the magnetostrictive devices have high residual compressive stresses of 39 kgf/mm$^2$ or higher on the surface. At points 0.3 mm deep, on the other hand, the specimens of the invention E1, E2 are found to have residual compressive stresses of 20 kgf/mm$^2$ or higher while the comparison specimen C1 has almost zero residual compressive stress.

In this embodiment these magnetostrictive devices (E1, E2, C1) were used to form magnetostrictive torque sensors 100 like the one shown in FIG. 1 and various characteristics were measured.

The torque sensors 100 each have the magnetostrictive device 1 supported rotatable in the housing 5 through bearings 4 and a group of coils 2 is arranged in the housing 5, as shown in the figure.

The group of coils 2, as shown, has two sets of excitation coils 21, 22 and two sets of detection coils 23, 24, all these coils wound on a bobbin 20.

The bobbin 20 has a pair of coil grooves in the axial front and rear portions thereof, with the excitation coils 21, 22 wound on the lower part of the coils grooves (inner diameter side) and the detection coils 23, 24 wound on the upper part (on the outer diameter side). The windings of the excitation coils 21, 22 have 60 turns each and the windings of the detection coils 23, 24 have 180 turns each.

As shown in FIG. 1, the bobbin 20 is supported in the housing 5 and arranged opposed, without contact, to the chevron pattern 15 of the shaft body 1.

Further, as shown in the figure, the coils 21–24 of the coil group 2 are connected through inner lead wires 63 to a printed circuit board 6, which in turn is electrically connected through lead wires 65 to an external measuring device.

Next, the sensor sensitivity and hysteresis were measured by using the torque sensor 100 of the above construction when the excitation frequency is high (50 kHz).

At the excitation frequency of 50 kHz and the constant voltage excitation of 2.2 V, the sensor output (mV) for a given applied torque (Nm) were measured. The sensor output is a signal produced in the detection circuit of the torque sensor minus an amplifier component.

The sensor sensitivity ($\Delta V$ %) is a difference between the sensor output when a +7 Nm torque is applied and the sensor output when a −7 Nm torque is applied, divided by the sensor output when no torque is applied.

The hysteresis (%) is a difference between the sensor output when a +7 Nm torque applied is released and the sensor output when a −7 Nm torque applied is released, divided by a difference between the sensor output when a +7 Nm torque is applied and the sensor output when a −7 Nm torque is applied.

The result of measurement of the sensor sensitivity ($\Delta V$ %) and the hysteresis (%FS) is shown in Table 2.

As can be seen from Table 2, the specimens of the invention E1, E2 both exhibit better sensor sensitivity and hysteresis than those of the comparison specimen C1 when the excitation frequency is high (50 kHz).

Next, the stability against excess load torques was measured at the excitation frequency of 50 kHz.

Figure 6:
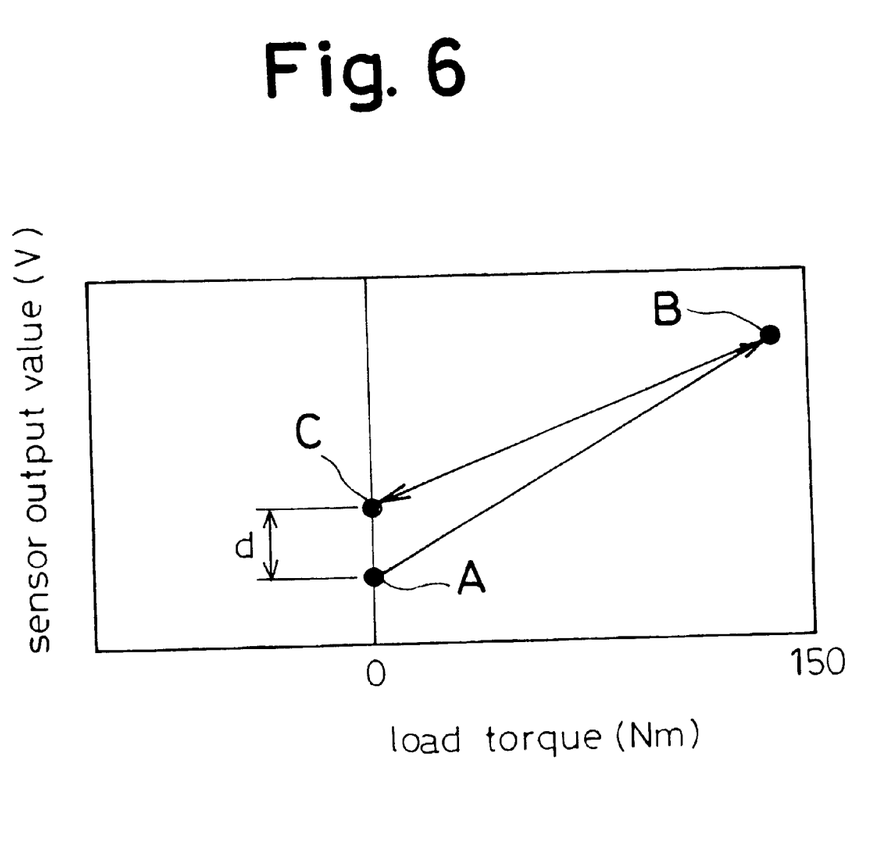
FIG. 6 is an explanatory view showing how a zero point drift is calculated in the Embodiment 1.

Under the same conditions as used in measuring the sensor output described above, an excess load torque was applied and the zero point drift (%) was determined from the sensor output values before and after the torque application. The zero point drift, as shown in FIG. 6, is determined by measuring a deviation d between the output value A before the application of an excess load torque and the output value C after the release of the excess load torque and calculating the percentage (%) of the deviation d with respect to the full scale voltage in the normal use range.

In the magnetostrictive device of the size of this example, if the zero point drift for an excess load torque of 150 Nm is 10% or less, the device has an excellent stability against the excess load torque and can be used as a torque sensor for automotive steering.

In this example, two kinds of excess load torque, 100 Nm and 150 Nm, were applied to each of the specimens.

The result of measurement is shown in Table 2.

As can be seen from Table 2, the specimens of the invention E1, E2 have significantly improved stabilities for the excess load torque, compared with the comparison specimen C1.

TABLE 1

| | | Composition (weight %) | | | | | | | Heat treatment condition | | | |
| | | | | | | | | | Quenching temperature | Tempering temperature | | Excess load |
| Specimen No. | | C | Si | Mn | P | S | Ni | Cr | Fe | ° C. | ° C. | Cold working | application |
| Invention | E1 | 0.38 | 0.27 | 0.55 | 0.016 | 0.007 | 0.12 | 13.11 | trace | None | None | Rolling | 1 time |
| | E2 | ↑ | ↑ | ↑ | ↑ | ↑ | ↑ | ↑ | ↑ | 1000 | 680 | Swaging | ↑ |
| Comparison | C1 | ↑ | ↑ | ↑ | ↑ | ↑ | ↑ | ↑ | ↑ | ↑ | 650 | Shot peening | ↑ |
| Invention | E3 | ↑ | ↑ | ↑ | ↑ | ↑ | ↑ | ↑ | ↑ | ↑ | 600 | Swaging | ↑ |
| Comparison | C2 | ↑ | ↑ | ↑ | ↑ | ↑ | ↑ | ↑ | ↑ | ↑ | ↑ | Swaging | ↑ |
| Comparison | C3 | Commercially available (SNCMB15) | | | | | | | | | | Shot peening | Unknown |

TABLE 2

| Specimen No. | | Mechanical property | | | Residual compressive stress | | Output characteristic Frequency (50 kHz) | | Zero point drift for excess load torque Frequency (50 kHz) | |
|---|---|---|---|---|---|---|---|---|---|---|
| | | Inner hardness (Hv) | Tensile strength (kgf/mm$^2$) | Yield point | Surface (kgf/mm$^2$) | Depth 300 μm | Sensitivity (%) | Hysteresis (%) | 100 Nm (%) | 150 Nm (%) |
| Invention | E1 | 300 | 98 | 72 | 50 | 35 | 0.44 | 0.8 | 0.5 | 2.8 |
| | E2 | 300 | 95 | 70 | 39 | 20 | 0.38 | 1.8 | 11.0 | 14.5 |
| Comparison | C1 | 300 | 95 | 70 | 60 | 0 | 0.25 | 2 | 14.3 | 21.5 |
| Invention | E3 | 350 | 105 | 85 | 40 | 28 | 0.42 | 0.8 | 0.6 | 3.1 |
| Comparison | C2 | 350 | 106 | 86 | 62 | 4 | 0.3 | 0.9 | 4.3 | 6.5 |
| Comparison | C3 | 430 | 140 | 113 | 37 | 0 | 0.27 | 1.3 | 17.0 | — |

Embodiment 2

In this example, a Fe—Cr alloy material similar to the one used in the Embodiment 1 was used to manufacture magnetostrictive devices, which were adjusted to have the hardness inside the shaft body of about Hv350 or higher, and their performances were evaluated. The magnetostrictive devices prepared are one kind of specimen of the invention (E3) and two kinds of specimens for comparison (C2, C3).

(Specimen of the Invention E3)

The specimen of the invention E3 was fabricated in a manner similar to the specimen of the invention E2 in the Embodiment 1, except that only the tempering temperature was changed to 600° C. The excess load torque was applied one time as in the case of the specimen of the invention E1.

(Specimen for Comparison C2)

The specimen for comparison C2 was manufactured in a manner similar to the comparison specimen C1 of the Embodiment 1, except that only the tempering temperature was changed to 600° C. The excess load torque was applied one time as in the case of the comparison specimen C1.

(Specimen for Comparison C3)

The specimen for comparison C3 used a magnetostrictive device incorporated in the magnetostrictive torque sensor available on the market. It is made of a material JIS-SNCM815 and treated with shot peening. The outer geometry is the same as the specimen of the invention E3. Whether it was subjected to the excess load application process is not known.

Next, mechanical properties of the specimens (E3, C2, C3) were measured. The conditions of measurement are the same as in the Embodiment 1. The result of measurement is shown in Table 2.

As can be seen from Table 2, the specimen of the invention E3 and the specimen for comparison C2 both have the hardness of about Hv350 and are almost equal in tensile strength and yield point. In contrast, the commercially available product C3 has a very high hardness inside the shaft body of Hv430 and also higher values of tensile strength and yield point than E3 and C2.

Next, the crest portions of the ridges 17 in the magnetic anisotropic portion 15 of the magnetostrictive devices (plateau portion 171 for E3 and crest for C2 and C3) were measured for the residual compressive stress. The points of measurement are at the surface and at a depth of 0.3 mm. The result of measurement is shown in Table 2. The method of measurement is similar to the Embodiment 1.

As is seen from Table 2, at the surface, high residual compressive stresses were obtained, with the highest value found in C2 followed by E3 and C3 in that order. At the point 0.3 mm deep, on the other hand, the specimen of the invention E3 has the highest residual compressive stress while the comparison specimens C2 and C3 have almost no residual compressive stresses.

Next, magnetostrictive torque sensors 100 similar to those of the Embodiment 1 were fabricated and a variety of characteristics measured.

The torque sensors 100 were used to measure the sensor sensitivity and hysteresis when the excitation frequency was 50 kHz. The measuring conditions are the same as those of the Embodiment 1.

The result of measurement of the sensor sensitivity (ΔV %) and hysteresis is shown in Table 2.

As is seen from Table 2, the specimen of the invention E3 is superior in sensor sensitivity characteristic and hysteresis characteristic to the comparison specimens C2, C3.

Next, the stability against excess load torques was measured for the excitation frequency of 50 kHz. The measuring conditions are the same as the Embodiment 1.

The result of measurement is shown in Table 2.

As is seen from Table 2, the specimen of the invention E3 has a significantly improved stability against the excess load torque at any excitation frequency, compared with the comparison specimens C2, C3.

Embodiment 3

In this embodiment, the specimen of the invention E3 and comparison specimen C2 of the Embodiment 2 are used to evaluate the stability against excess load torques.

In more detail, the magnetostrictive devices were used to form the torque sensors 100 as described above and an excess load torque of 100 Nm was applied for three excitation frequencies, 20 kHz, 30 kHz and 50 kHz, to measure the zero point drift (%). The method of measuring the zero point drift is the same as described above.

The result of measurement is shown in Table 3.

As shown in Table 3, the specimen of the invention E3 has a smaller zero point drift than the comparison specimen C2 for all frequencies, indicating that the specimen E3 is excellent in the stability against excess load torque.

It is also found that the lower the frequency, the greater the degree to which the specimen E3 is superior in improving the stability against excess load torque to the comparison specimen C2. This is considered due to the fact that the specimen of the invention E3 has the residual compressive stress in greater depth in the ridges 17 than does the comparison specimen C2.

TABLE 3

| Excitation frequency | 20 kHz | | 30 kHz | | 50 kHz | |
|---|---|---|---|---|---|---|
| Specimen No. | E3 | C2 | E3 | C2 | E3 | C2 |
| Zero point drift for excess load torque (%) | 37.3 | 49.3 | 14.8 | 32.6 | 0.6 | 4.3 |
| C2-E3 | | 12.0 | | 17.8 | | 3.7 |

Embodiment 4

In this embodiment, the more detailed distribution of residual compressive stress in the ridges 17 was measured to verify that the specimen of the invention has a better sensor sensitivity characteristic (stability against excess load torque) than the comparison specimen.

First, magnetostrictive devices as specimens of the invention, E1 and E3 and comparison specimen C2 were prepared. The residual compressive stress was measured from the surface of the ridges 17 in the direction of depth. The conditions of measurement are the same as those in the Embodiment 1.

Figure 7:
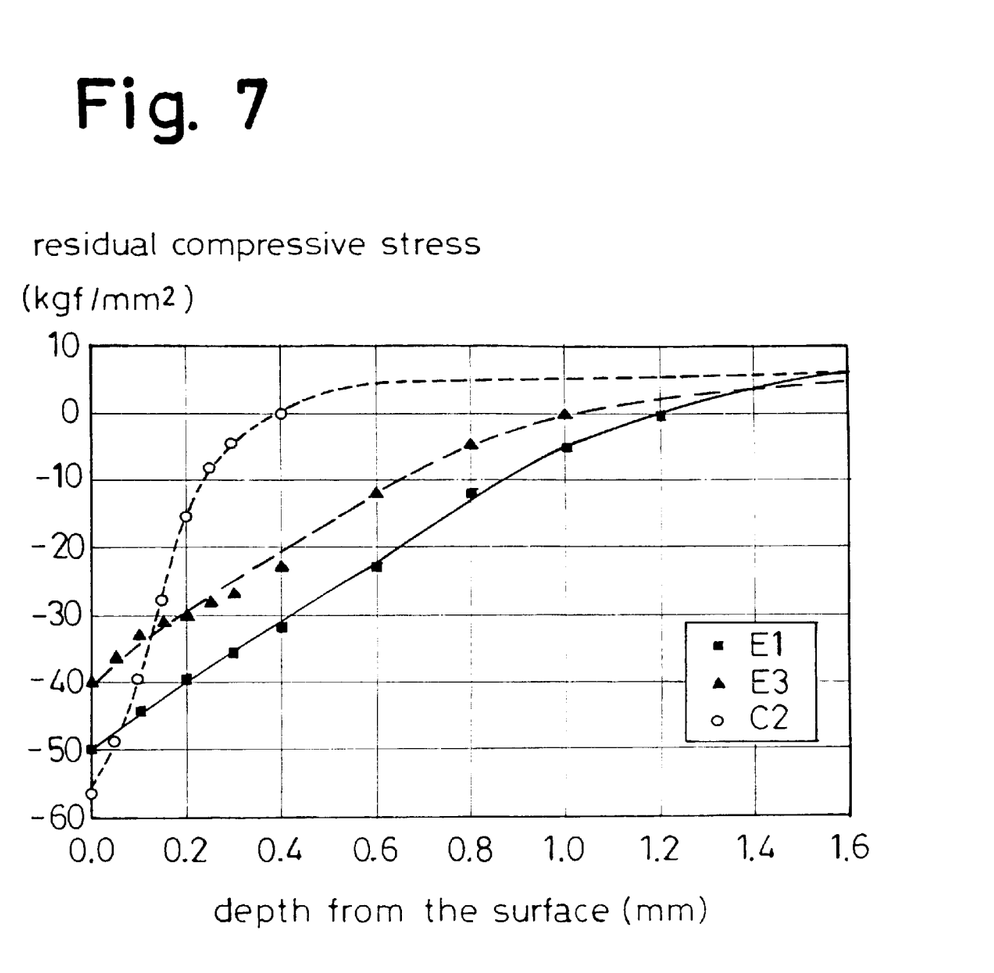
FIG. 7 is an explanatory view showing the relation between the depth from the surface of the ridge and the residual compression stress in Embodiment 4.

The result of measurement is shown in FIG. 7, in which the abscissa represents the depth from the surface of the ridge and the ordinate represents the residual compressive stress (kgf/mm²).

As can be seen from FIG. 7, the comparison specimen C2 exhibits the highst residual compressive stress at the surface of the ridge 17. The residual compressive stress in the comparison specimen C2, however, sharply decreases as the depth increases. At a depth of at least 0.1 mm or more, the residual compressive stress is smaller than that of the specimens of the invention E1, E3. The specimens of the invention E1, E3, on the other hand, have the residual compressive stress remaining at very large depths.

These differences are considered due to the difference in the process to which the ridges 17 are subjected.

That is, the residual compressive stresses can be made to remain in greater depths by directly applying a compressive stress only to the ridges to cause deformations accompanied by plastic flow (such as swaging) to form the almost planar plateau portion 171 at the top of the ridges 17 than by performing the shot peening on the entire magnetic anisotropic portion as in the convention method.

It can be seen that the greater the depth at which the residual compressive stress remains, the more stable the device is against the excess load torque.

Embodiment 5

In this embodiment, a magnetostrictive device as the specimen of the invention E3 was used to determine the hardness distribution in the cross section of the magnetic anisotropic portion 15.

Figure 8:
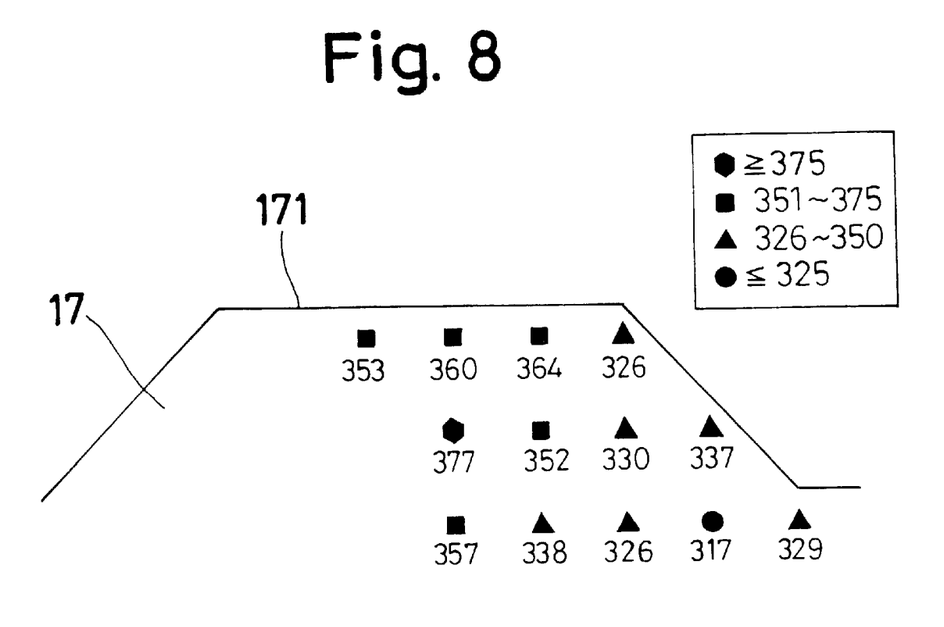
FIG. 8 is an explanatory view showing a hardness distribution in a cross section of the ridge in Embodiment 5.

The points of measurement and the result of measurement are shown in FIG. 8. As shown in the figure, the hardness was measured at points located 50 μm, 200 μm and 350 μm deep and arranged at a width wise pitch of 150 μm. At the trough portions, too, the hardness was measured at a point about 50 μm deep. These measurements were made by a micro-Vickers hardness meter using a load of 200 g for 20 seconds.

FIG. 8 shows that hardness is high down to a great depth under plateau portion 171 of the ridge 17. This is considered to produce the residual compressive stress mentioned above.

The trough 16 is shown to have a very low hardness, compared with the hardness inside the ridge 17. This is because only the ridges are directly applied with the compressive stress to cause deformations accompanied by plastic flow, rather than hardening the entire surface of the magnetic anisotropic portion by the conventional shot peening process.

Figure 9:
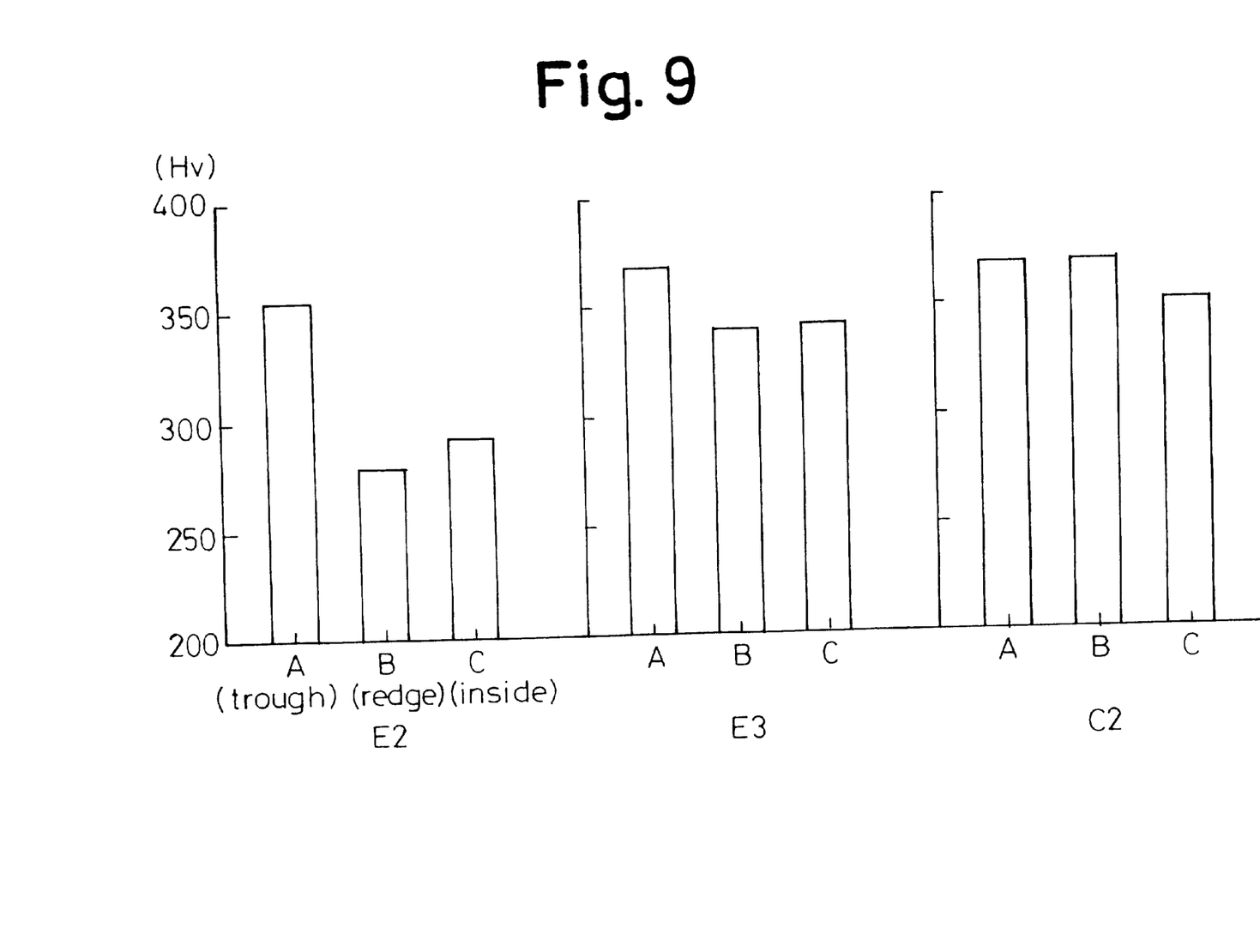
FIG. 9 is an explanatory view showing a hardness distribution in Embodiment 5.

Next, in this embodiment, as shown in above mentioned FIGS. 2(a), (b), hardnesses of the specimens of the invention E2, E3 and the comparison specimen C2 measured at a position A 50 μm deep in the ridge 17, at a position B 50 μm deep in the trough 16, and at point C inside the shaft body were plotted on a graph for comparison. FIG. 9 shows the result of measurement with the abscissa representing the location of hardness measurement and the ordinate representing the hardness (Hv).

The graph shows that the specimens of the invention E2, E3 both have substantially greater hardnesses in the ridge than in the trough or in the shaft body. By contrast, the comparison specimen C2 has substantially higher hardnesses in both the ridge and the trough than in the shaft body.

These differences reflect the difference in characteristic between the conventional shot peening process and the method of this invention that directly applies a compressive stress only to the ridges to cause deformations accompanied by plastic flow.

Embodiment 6

In this embodiment, the specimen of the invention E3 was used to verify the advantage obtained by preloading the specimen with the excess load torque.

To describe in more detail, the specimen of the invention E3 was manufactured by the manufacturing method shown in the Embodiment 2. The number of times that the final excess load torque was applied was changed and then the zero point drift (%) was measured. The measurement of the zero point drift was performed for three different excitation frequencies of 20 kHz, 30 kHz and 50 kHz.

Figure 10:
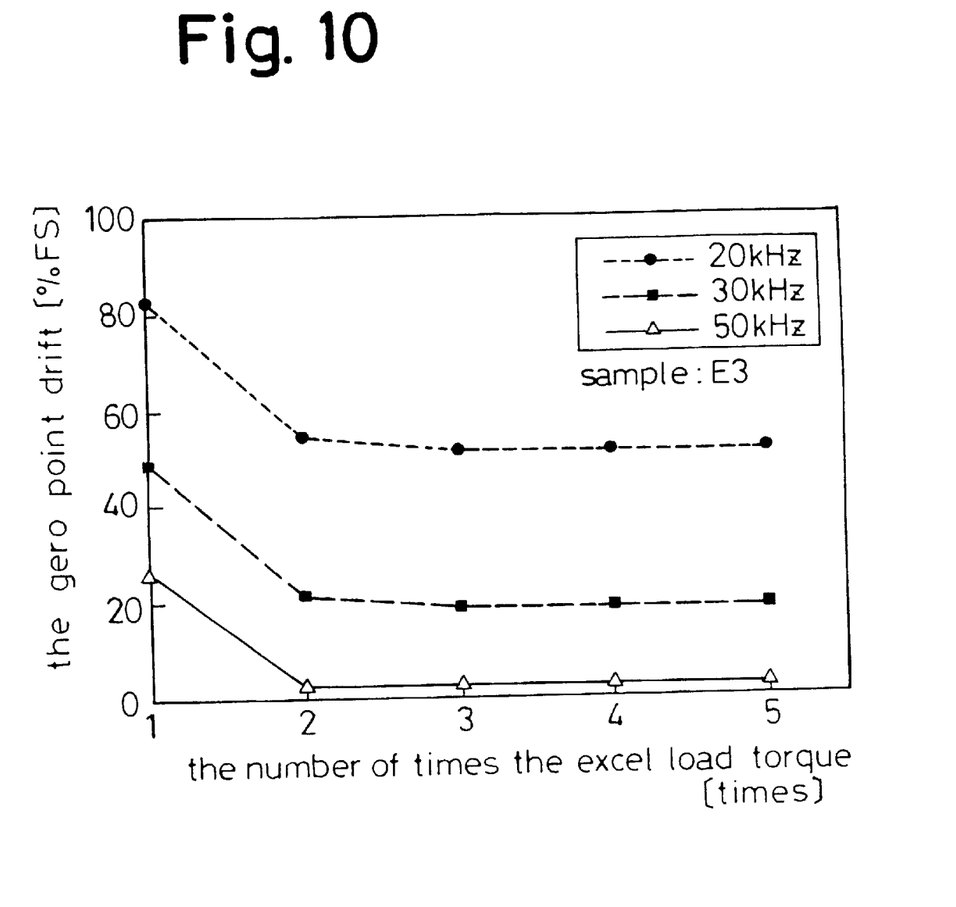
FIG. 10 is an explanatory view showing the relation between the number of times that an excess load torque is preloaded and the zero point drift.

The result of measurement is shown in FIG. 10. In the figure the abscissa represents the number of times the excel load torque was applied in advance and the ordinate represents the zero point drift (%) after the excess load torque application.

The graph shows that applying an excess load torque two or more times is effective in improving the zero point drift for any of the frequencies.

Embodiment 7

In this embodiment, magnetostrictive devices 1 made of a Fe—Ni—Mo—Al—B alloy material were prepared as a specimen of the invention E4 and two comparison specimens C4, C5, and their performances were compared.

These magnetostrictive devices were adjusted to have hardnesses of about Hv217 inside the shaft body for easy comparison.

(Specimen of the Invention E4)

In manufacturing the specimen of the invention E4, the materials were compounded to have the component composition as shown in Table 4 and an ingot was produced. Next, the ingot was hot-forged and then cold-worked resulting in a cross-sectional area reduction of 19%. Then, the shaft body was annealed at 750° C. for an hour for recrystallization with a grain diameter of 15 μm. Then, the shaft body is machined into a solid shaft 17 mm in outer diameter and 120 mm in length.

Next, as shown in FIG. 3, the shaft body was form-rolled to form spiral grooves in its surface in a chevron pattern similar to that used in the Embodiment 1.

Next, only the ridges 17 were directly applied with a compressive stress, as in the specimen of the invention E1 of the Embodiment 1, to cause deformations accompanied by plastic flow. In more detail, a tool 7 having both the form-rolling portion 71 and the rolling portion 72 as shown in FIG. 3 was used to roll the shaft body immediately after the form-rolling operation. Then, as in the Embodiment 1, the crest portions of the ridges 17 were flattened to form almost planar plateau portions 171 as indicated by a solid line b1 of FIG. 2(a).

Next, the shaft body was subjected to the excess load application process where it was applied with an excess load torque twice. The magnitude of the excess load torque is ±150 Nm.

In this way the magnetostrictive device as the specimen of the invention E4 was obtained.

(Specimen for Comparison C4)

The comparison specimen C4 was subjected to the shot peening instead of the rolling performed on the specimen of the invention E1. The condition of the shot peening process is equal to that used for the comparison specimen C1. It was also subjected to the excess load application process similar to the one described above. In other respects, it underwent the same operations as performed on the specimen of the invention E4.

(Specimen for Comparison C5)

The comparison specimen C5 was formed with the ridges and troughs only by cutting, not by form-rolling or rolling. The shapes of the ridges and the troughs are the same as those of the specimen of the invention E4 (see FIG. 2(a)).

Next, the mechanical properties of these specimens (E4, C4, C5) were measured. The conditions of measurement are equal to those used in the Embodiment 1. The result of measurement is shown in Table 4.

Table 4 shows that the specimen of the invention E4 and the comparison specimens C4, C5 both have a hardness inside the shaft body of about Hv217 and thus almost equal strength characteristics.

Next, a magnetostrictive torque sensor 100 similar to the one used in the Embodiment 1 was manufactured to measure a variety of characteristics.

The torque sensor 100 was used to measure the sensor output, sensitivity and hysteresis when the excitation frequency was 50 kHz. The conditions of measurement were equal to those used in the Embodiment 1.

The results of measurement of sensor output, sensitivity and hysteresis are shown in Table 4.

The table shows that the specimen of the invention E4 exhibits a better sensor sensitivity characteristic than the comparison specimens C4, C5 whether the excitation frequency is high or low.

Embodiment 8

Figure 11:
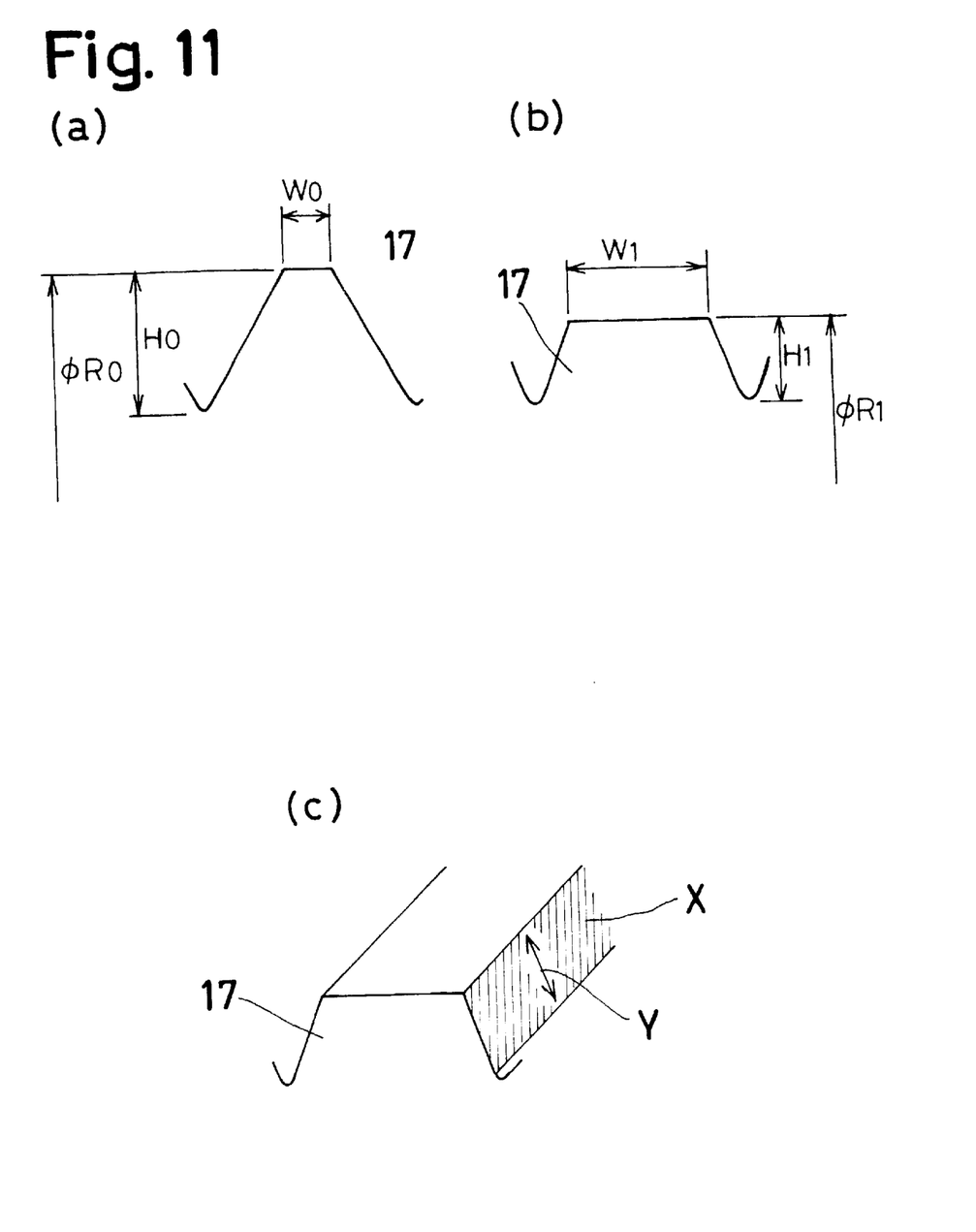
FIGS. 11(a), 11(b) and 11(c) are schematic views showing (a) a cross-sectional shape of the ridge after being rolled, (b) a cross-sectional shape of the ridge after being swaged, and (c) a point at which to measure the residual stress and a direction of measurement.

This embodiment shows the result of measurement of residual stresses in the side surfaces of the ridge of the shaft body, which was manufactured under the same conditions as the specimen of the invention E3 that was subjected to the swaging in the embodiment 2, as shown in FIG. 11.

FIG. 11(a) shows the cross section of the specimen after being form-rolled, FIG. 11(b) shows the cross section after swaging, and FIG. 11(c) shows the residual stress measuring position (patched portion X) and the direction of measurement (arrow Y).

For ease of measurement, the specimen of the invention E3 (used in Table 1 and Table 2) was formed with slightly larger ridges. Specifically, the ridges 17 in FIG. 11(a) after being form-rolled have a height $H_0$ of 0.72 mm, a crest width $W_0$ of 0.4 mm and a diameter $R_0$ of 16.8 mm. The ridges 17 in FIG. 11(b) after being swaged measure 0.37 mm in height $H_1$, 1.25 mm in crest width $W_1$ and 16.1 mm in diameter $R_1$.

From the result of measurement it is found that the side surfaces of the ridges (hatched portion X) are applied with a residual tensile stress of +8.9 $kgf/mm^2$ in the direction of ridge height (arrow Y).

When, on the other hand, the shot peening instead of swaging is performed, the entire surface of the magnetic anisotropic portion is given a uniform residual compressive stress.

This indicates that the residual stress distribution in the surface of the magnetic anisotropic portion differs significantly between the swaging, that applies a compressive stress only to the ridges, and the shot peening, both performed as the cold working.

As described above, the present invention can provide a magnetostrictive device for a torque sensor which has a high sensor sensitivity whether the excitation frequency is in a high frequency range or in a low frequency range and can withstand excess load torques well, and also a method of manufacturing the same with ease.

What is claimed is:

1. A method of manufacturing a magnetostrictive device for a torque sensor having a magnetic anisotropic portion formed on a surface of a shaft body thereof and at least one of an excitation coil and a detection coil placed around the magnetic anisotropic portion, comprising:
    forming spiral grooves in the surface of the shaft body to form a plurality of troughs and ridges alternately; and
    directly applying a compressive stress only to the ridges to cause deformations accompanied by plastic flow and provide an almost planar plateau portion at a crest portion of each of the ridges.

2. A method of manufacturing a magnetostrictive device for a torque sensor according to claim 1, wherein application of the compressive stress to the ridges is performed by a rolling process.

TABLE 4

| | | | | | | Internal harness (Hv) | Output characteristic High frequency (50 kHz) | | |
|---|---|---|---|---|---|---|---|---|---|
| | Component Composition (weight %) | | | | | | | | |
| Specimen No. | | Fe | Ni | Mo | Al | B | | Output mV/Nm | Sensitivity ΔV, % | Hysteresis % |
| Invention | E4 | bal. | 47.0 | 3.0 | 3.0 | 0.1 | 217 | 3.7 | 1.5 | 0.2 |
| Comparison | C4 | ↑ | ↑ | ↑ | ↑ | ↑ | ↑ | 2.8 | 1 | 0.3 |
| Comparison | C5 | ↑ | ↑ | ↑ | ↑ | ↑ | ↑ | 3.2 | 1.3 | 0.3 |

3. A method of manufacturing a magnetostrictive device for a torque sensor according to claim 2, wherein forming of the spiral grooves and application of the compressive stress to the ridges are performed successively by one tool.

4. A method of manufacturing a magnetostrictive device for a torque sensor according to claim 2, wherein the compressive stress is applied to the ridges according to the relation $0.2 < (H_0-H_1)/H_0 < 0.48$ wherein $H_0$ is a height of the ridges before receiving the compressive stress and $H_1$ is a height of the ridges after receiving the compressive stress.

5. A method of manufacturing a magnetostrictive device for a torque sensor according to claim 1, wherein forming of the spiral grooves and application of the compressive stress to the ridges are performed successively by one tool.

6. A method of manufacturing a magnetostrictive device for a torque sensor according to claim 1, wherein the compressive stress is applied to the ridges according to the relation $0.2 < (H_0-H_1)/H_0 < 0.48$ wherein $H_0$ is a height of the ridges before receiving the compressive stress and $H_1$ is a height of the ridges after receiving the compressive stress.

7. A method of manufacturing a magnetostrictive device for a torque sensor according to claim 1, wherein the shaft body receives an excess load torque one or more times after the magnetic anisotropic portion is formed.

8. A method of manufacturing a magnetostrictive device for a torque sensor according to claim 1, wherein application of the compressive stress to the ridges is performed by a swaging process.

9. A magnetostrictive device for a torque sensor comprising:
    a magnetic anisotropic portion formed on a surface of a shaft body thereof and at least one of an excitation coil and a detection coil placed around the magnetic anisotropic portion;
    wherein the magnetic anisotropic portion has a plurality of troughs and ridges arranged alternately, the troughs and ridges being defined by a plurality of spiral grooves in the surface of the shaft body, the ridges each having a substantially planar plateau portion, the substantially plateau portion of each ridge being formed by a compressive stress directly applied only to the ridges to cause deformations accompanied by plastic flow.

10. A magnetostrictive device for a torque sensor according to claim 6, wherein a residual compressive stress in the plateau portion is 30 kgf/mm$^2$ or more at a surface and 20 kgf/mm$^2$ or more at a depth of 0.3 mm from the surface.

* * * * *

UNITED STATES PATENT AND TRADEMARK OFFICE
CERTIFICATE OF CORRECTION

PATENT NO.   : 6,595,073 B1
DATED        : July 22, 2003
INVENTOR(S)  : Wataru Yagi et al.

It is certified that error appears in the above-identified patent and that said Letters Patent is hereby corrected as shown below:

Column 16,
Line 20, "claim 6" should read -- claim 9 --.

Signed and Sealed this

Fourteenth Day of October, 2003

JAMES E. ROGAN
*Director of the United States Patent and Trademark Office*